US008218225B2

(12) United States Patent
Georen et al.

(10) Patent No.: US 8,218,225 B2
(45) Date of Patent: Jul. 10, 2012

(54) ELECTROLYTES FOR ELECTROCHROMIC DEVICES

(75) Inventors: Peter Georen, Solna (SE); Roser Marsal Berenguel, Uppsala (SE)

(73) Assignee: ChromoGenics AB, Uppsala (SE)

( * ) Notice: Subject to any disclaimer, the term of this patent is extended or adjusted under 35 U.S.C. 154(b) by 78 days.

(21) Appl. No.: 12/989,184

(22) PCT Filed: Apr. 24, 2009

(86) PCT No.: PCT/EP2009/054986
§ 371 (c)(1),
(2), (4) Date: Nov. 16, 2010

(87) PCT Pub. No.: WO2009/130316
PCT Pub. Date: Oct. 29, 2009

(65) Prior Publication Data
US 2011/0051218 A1    Mar. 3, 2011

(30) Foreign Application Priority Data
Apr. 24, 2008    (SE) ...................................... 0800941

(51) Int. Cl.
*G02F 1/153*    (2006.01)
*G02B 5/23*    (2006.01)
(52) U.S. Cl. ......... 359/265; 359/268; 359/270; 252/586
(58) Field of Classification Search .......... 359/265–275; 252/586
See application file for complete search history.

(56) References Cited

U.S. PATENT DOCUMENTS

| 4,807,977 | A | * | 2/1989 | Sammells | .................. 359/270 |
| 5,229,040 | A | | 7/1993 | Desbat et al. | |
| 2003/0165743 | A1 | | 9/2003 | Horikiri et al. | |
| 2006/0072182 | A1 | * | 4/2006 | Oh et al. | .................. 359/265 |
| 2007/0042266 | A1 | | 2/2007 | Oh et al. | |

FOREIGN PATENT DOCUMENTS

| FR | 2910137 | 6/2008 |
| WO | 02054515 | 7/2002 |
| WO | 2006033545 A1 | 3/2006 |
| WO | 2008013501 A1 | 1/2008 |

OTHER PUBLICATIONS

International Search Report, dated Aug. 3, 2009, from corresponding PCT application.

* cited by examiner

*Primary Examiner* — Evelyn A. Lester
(74) *Attorney, Agent, or Firm* — Young & Thompson

(57) ABSTRACT

An electrolyte for electrochromic devices is manufactured by mixing (210) a solvent, an ionisable substance and a solvated polymer. The solvent comprises a substance having an amide group and selected from a specified group of substances. The ionisable substance comprises an anion and a cation, where the cation preferably is selected among the alkaline ions. The anion is selected from simple anions, such as hydroxide ions, halide ions or more or less complex organic anions. The polymer is solvated in the mixture of the two other components.

21 Claims, 5 Drawing Sheets

ELECTROLYTES FOR ELECTROCHROMIC DEVICES

TECHNICAL FIELD

The present invention relates in general to electrolytes for electrochromic devices and methods for manufacturing thereof.

BACKGROUND

Electrochromic devices are devices that experience a change in colour due to an electrochemical reaction caused by the application of an electric field. The result is a change in e.g. light transmission properties. Electrochromic devices are utilized in many different applications, ranging from architectural windows, information displays, light filters and modulators, rear-view mirrors, sunroofs and windows in vehicles, eyewear, helmet visors, ski goggles, surfaces with variable thermal emissivity to camouflage surfaces. The change from light to dark or from dark to light can be accomplished extremely energy efficiently.

A typical electrochromic device comprises at least five superimposed layers deposited on one substrate or positioned between two substrates in a joined together configuration. The central part of the five-layer electrochromic stack is an ion conductor, typically an electrolyte. The ion conductor is in contact with an electrochromic film, capable of conducting electrons as well as ions. On the other side of the ion conductor is an electron and ion conducting counter electrode film serving as an ion storage layer. The counter electrode film could also be constituted by an electrochromic film. The central three-layer structure is positioned between electron conducting layers. Such a device is coloured or bleached by applying an external voltage pulse between the electron conducting layers on the two sides of the stack, causing the electrons and ions to move between the electrochromic layer and the counter electrode layer.

A commonly expressed requirement of an electrochromic device is to be able to provide a fast change of the colour in a reliable and durable manner. This puts high demands on the electrolyte that should transport the charge from one side of the device to the other. Large efforts have been made to find suitable electrolytes having attractive properties for electrochromic applications.

In the published U.S. patent application 2006/0072182 or the equivalent published international patent application WO 2006/033545, electrolytes suitable for electrochromic purposes are presented. A wide range of mixtures between a compound having an acid functional group and a basic functional group and an ionisable lithium salt is presented. The mixtures are eutectic, thereby forming fluid electrolytes. The electrolytes are typically used in electrochromic devices having rigid substrates. The substrates are put together with a volume intended for the electrolyte in between, and the edges of that volume are sealed off. By providing vacuum in the volume between the substrates, the fluid eutectic mixture can efficiently be sucked into the volume, filling essentially all parts of it. In particular embodiments, the rigidity of the final electrochromic device is enhanced by adding monomers to the eutectic mixture sucked into the electrolyte volume and polymerizing the monomers in situ into a rigid polymer structure around which the electrolyte is disposed.

In some applications, further requirements can be put on the electrochromic devices. Complex geometrical structures of the electrochromic devices may be needed, or the electrochromic device is preferably using one or two flexible substrates. In such situations, the approach of using vacuum for introducing the electrolyte into the device is troublesome. Alternative manufacturing methods are then available. One approach is to prepare two substrates and laminate them together with the electrolyte in between. In such a process, however, the eutectic electrolyte mixtures according to prior art are directly unsuitable due to their fluid properties.

SUMMARY

An object of the present invention is to provide electrolytes that are suitable for electrochromic devices having flexible substrates and/or are manufactured by lamination.

The above object is achieved by the electrolytes and methods according to the enclosed patent claims. In general words, according to a first aspect, an electrolyte for electrochromic devices comprises a mixture of a solvent, an ionisable substance and a solvated polymer. The solvent comprises a substance having an amide group and having a structure according to:

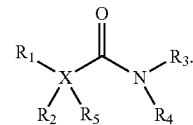

X is a carbon atom, nitrogen atom, oxygen atom or aryl group with arbitrary substituents on the aryl ring, with the proviso that when X is a nitrogen atom, $R_2$ is null, and when X is an oxygen atom, both $R_1$ and $R_2$ are null, and when X is an aryl group, $R_1$, $R_2$ and $R_5$ are all null. $R_1$ through $R_3$ are individually selected from a hydrogen atom or a carbon-based group. $R_4$ and $R_5$ can also be individually selected from a hydrogen atom or a carbon-based group. $R_4$ and $R_5$ can alternatively together form a carbon-based group, giving the solvent a ring structure. The ionisable substance forms a solution together with the solvent.

According to a second aspect, an electrochromic device comprises an electrolyte according to the first aspect.

According to a third aspect, a method for manufacturing of an electrolyte suitable for electrochromic devices comprises mixing of a solvent, an ionisable substance and a polymer according to the composition of the first aspect.

According to a fourth aspect, a method for manufacturing an electrochromic device comprises providing of an electrolyte according to the first aspect or providing according to the third aspect of an electrolyte and placing the electrolyte between two substrate layers.

One advantage with the present invention is that high-performance electrolytes are provided to a wider range of electrochromic devices.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
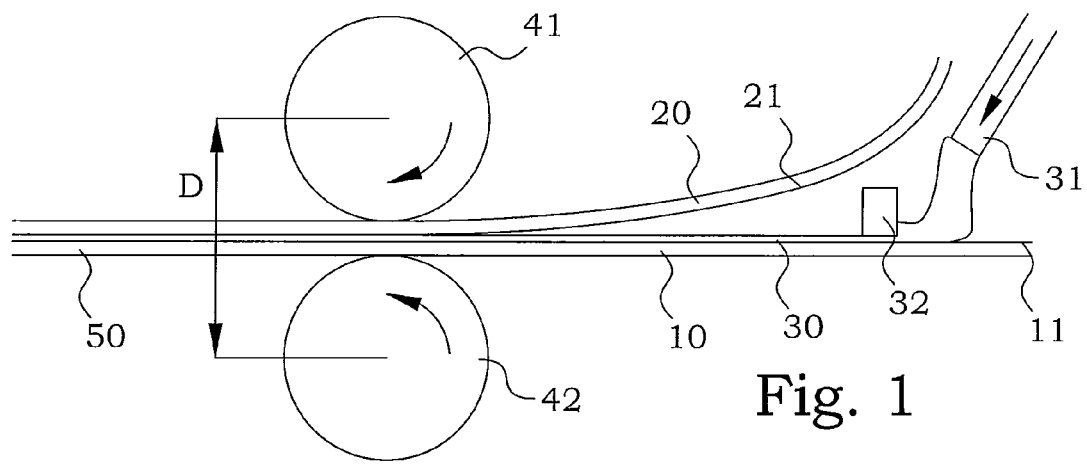
FIG. 1 is a schematic drawing illustrating a general lamination process.

According to the present invention, an electrolyte for an electrochromic device is provided by a mixture of three ingredients. The first ingredient is a solvent. The solvent comprises an amide, i.e. a substance having an amide group. The second ingredient is an ionisable substance, being capable of conducting ionic current.

By also adding a third ingredient into the mixture, different properties, e.g. viscosity, can be modified, while attractive electrolytic properties still are obtainable. However, typically, the relative amount of the two first ingredients has to be adjusted in order to reach the most preferable properties. According to the present invention, a polymer solvated in the first two ingredients is used as the third ingredient.

This differs completely from prior art approaches, e.g. of U.S. 2006/0072182 (WO 2006/033545) where a rigid polymer structure is obtained by in-situ polymerization of monomers. The monomers do not significantly influence the viscous properties, which in that particular application was a prerequisite for being able to enter the electrolytes into the volume between the substrates.

For the electrolyte to be suitable to use for e.g. lamination procedures during the manufacturing of electrochromic devices it is found that the electrolyte presents a certain type of rheological properties. For fluid electrolytes, being Newtonian or non-Newtonian, the apparent Newtonian dynamic viscosity is of high importance, and from experiments, it was found that electrolytes having viscosities in the range of 5-200 Pa·s at 22° C. and a shear rate of 4 sec$^{-1}$ are to prefer. The upper limit was selected mainly due to practical manufacturing reasons, mainly dispensing and mixing considerations. The mixing of fluid electrolytes became troublesome at even higher viscosities. However, the actual lamination could be performed also at higher viscosities, and if other manufacturing processes are utilized also such mixings could be used. The lower limit was set in order to achieve an electrolyte that could provide an even thickness during and after lamination. This is discussed further below. An even more preferred viscosity range was 20-40 Pa·s, with the same definition, as a found presently best compromise. This is discussed more in detail in an example below. In addition, it was also found that non-Newtonian electrolyte fluids are possible to use, where non-Newtonian electrolyte fluids experiencing shear-thinning or thixotropic properties, are preferred.

TABLE 1

Conductivity and viscosity properties of examples of solvent and salt mixtures.

| Solvent | Salt | melting point [° C.] | Ratio solvent: salt | Conduct. [S/m] | Viscosity (25° C.) [Pa · s] |
|---|---|---|---|---|---|
| Acetamide | — |  |  |  | 81.2 |
| — | LiTFSI |  |  |  | 234 |
| Acetamide | LiTFSI | −67 | 4:1 | 0.1 | 0.1 |
| Urea | LiTFSI | −38 | 3:1 | 0.023 | 1.2 |
| Methylurea | LiTFSI | −8 | 3:1 | 0.012 | 0.68 |
| Caprolactam | LiTFSI | −39 | 3:1 | 0.003 | 3.1 |
| Valerolactam | LiTFSI | −45 | 3:1 | 0.017 | 0.9 |
| Trifluoroacetamide | LiTFSI | −11 | 3:1 | 0.08 | 0.09 |
| Methylurea | LiClO$_4$ | −9.2 | 3:1 | 0.022 | 0.99 |
| Acetamide | LiSO$_2$CF$_3$ | −50 |  | 0.35 | 0.03 |
| Methylurea | LiSO$_2$CF$_3$ | −34 |  | 0.25 | 0.09 |
| Methylcarbamate | LiTFSI | −65 | 3:1 | 0.14 | 0.02 |
| N-benzylformamide | LiTFSI | −52 |  | 0.003 | 0.08 |
| Methylcarbamate | LiSCN | 10 | 3:1 | 0.17 | 0.02 |
| Acetamide | NaSCN | 10 | 3:1 | 0.24 | 0.15 |
| Methylurea | NaSCN | 10 |  | 0.09 | 0.27 |
| Acetamide + Urea | NaSCN | 10 |  | 0.29 | 0.13 |
| Methylcarbamate | NaSCN | 5 |  | 0.14 | 0.05 |
| N-benzylformamide | NaSCN | −46 |  | 0.034 | 0.15 |
| Acetamide | NH$_4$SCN | 5 |  | 1.7 | 0.02 |
| Caprolactam | NH$_4$SCN | 0 |  | 0.026 | 0.6 |
| Acetamide + Urea | NH$_4$NO$_3$ | 20 |  | 0.002 | 0.05 |

For gel, solid and solid-like electrolytes, the visco-plastic or plastic properties are important parameters, for example the yield stress and plastic viscosity are important parameters affecting the lamination procedure.

In Table 1, examples of properties of a few solvent and salt mixtures possible to use for electrolyte purposes are shown. It is here easily understood that the presented viscosities are far too low to be used directly for e.g. lamination purposes.

FIG. 1 illustrates a typical general lamination process. A first substrate 10 and a second substrate 20 are provided with a respective surface coverage 11 and 21 comprising suitable electrochromic layers, counter electrode layers and electron conducting layers etc. for providing the electrochromic operation. An electrolyte 30 is provided at one of the substrates. Possibly, the electrolyte 30 is provided by a dispensing unit 31 and a distributer 32 to dispense an electrolyte layer over the surface. Alternatively, a line of an electrolyte may be dispensed onto the substrate in such a way that the following roll-pressing distributes the electrolyte over the surface. In further alternative ways, the electrolyte may be applied by spraying, screen printing or any similar techniques. The second substrate is brought in contact with surface coverage 21 coming into contact with the electrolyte 30. The entire stack of the substrates 10, 20 and the electrolyte 30 is transported between two rolls 41, 42, situated at a well determined relative distance D. The rolls 41, 42 presses the substrate stack together providing the resulting stack 50 with an electrolyte layer of a well determined thickness. The thickness is determined by the distance D, the radii of the rolls 41, 42 and the thicknesses of the substrates 10, 20. An excess of electrolyte is typically provided as a fluid front at the entrance to the roll section, thereby distributing electrolyte of the entire surface.

From such an illustration, it is easily understood that an easily fluent electrolyte is impossible to utilize. Such an easily fluent electrolyte such as selected from Table 1 will not give rise to any electrolyte layer with durable and controllable thickness. It is also unable to present any resistance force against motion during the actual laminating process, thereby being unable to ensure a well determined electrolyte layer thickness. Also, a solid electrolyte or an electrolyte based on a gel is in a general sense unsuitable, since they are generally difficult to distribute evenly over the surface of the substrate to such an accuracy that a lamination process would be possible to perform. However, solid or gel electrolytes having proper rheological properties may be utilized. The preferred rheology should show a yield stress or yield elongation followed by a viscosity behaviour, in which the material is plastically deformed similar to a fluid showing an apparent plastic viscosity. The preferred range of plastic viscosity at sufficient elongation should for these kinds of materials be less than 1000 Pa·s in order to be useful for e.g. lamination purposes. As mentioned above, electrolytes having shear-thinning, thixotropic, plastic or visco-plastic properties are found to be the optimum choice for laminating purposes.

Also for other manufacturing techniques, where lamination is not used, electrolytes according to the present invention may be of benefit. In devices where the seal of the electrolyte volume is difficult to keep intact during manufacturing or use, it is preferable that the electrolyte would not be able to escape through small holes or cracks.

Prior art materials presenting similar rheological properties as described above typically presents an ion conductivity that is strongly dependent on temperature. Even if an acceptable ion conductivity is present at room temperature or slightly elevated temperatures, the ion conductivity drops significantly for lower temperatures. The combination between suitable ion conductivity for electrolyte purposes and rheological properties along the lines presented above has earlier not been considered as possible.

Figure 2:
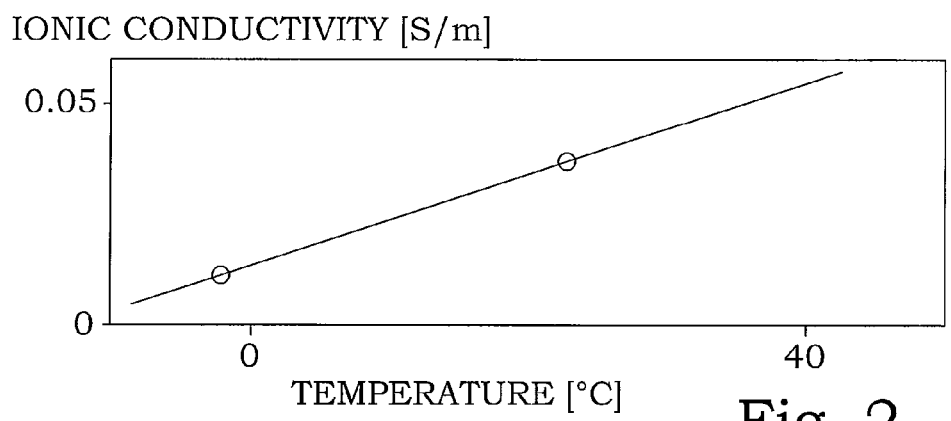
FIG. 2 is a diagram of ionic conductivity as a function of temperature.

It has therefore very surprisingly been discovered that the mixtures presented in the present invention, having the requested rheological properties, anyway present relatively high ion conductivity also at lower temperatures. In FIG. 2, a diagram is illustrated, where typical ion conductivity from this group of electrolyte materials is plotted as a function of temperature. The conductivity does indeed decrease, but not in the expected dramatic manner known from other viscous materials.

Another requirement for most applications of electrochromic devices is that the electrolyte has to be optically clear for light within a wavelength of use, i.e. typically the visible interval of 300-800 nm. It is preferable if the electrolyte does not absorb too much light, and an absorbance of less than 5% in the electrolyte is typically requested.

According to the present invention, the solvent comprises a compound selected from a group of amides, i.e. the solvent is selected to comprise a substance having an amide group. The solvent has a structure according to:

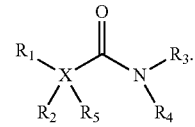

X is a carbon, nitrogen or oxygen atom. If X is a carbon atom, the solvent is an amide. If X is a nitrogen atom, the solvent is an urea and then $R_2$ is null, and if X is an oxygen atom, the solvent is a carbamate and then both $R_1$ and $R_2$ are null. X can also be an aryl group with arbitrary substituents on the aryl ring, and in that case, $R_1$, $R_2$ and $R_5$ are all null. $R_1$ through $R_5$ can be hydrogen atoms or carbon-based groups, typically organic. $R_1$ through $R_5$ are selected individually and can therefore be of a same type or different types. The carbon-based groups can be of arbitrary length, e.g. C1~C20. The carbon-based groups of $R_1$ through $R_5$ may individually be selected from carbon-based groups of C1~C15, carbon-based groups of C1~C10, carbon-based groups of C1~C6 or carbon-based groups of C1~C4. The carbon-based groups can e.g. be from one of the following types: alkyl groups, alkylamine groups, alkenyl groups, aryl groups or allyl groups. $R_4$ and $R_5$ can also together form a ring structure for the solvent. $R_4$ and $R_5$ then together form a carbon-based group, e.g. a linear or branched $[CH_2]_n$ group, where n=1 to 20. The solvent can also be a mixture of such substances. At least one of $R_1$ through $R_5$ may also be a polymer, thus having the amide group as a functional group.

Some more interesting candidates can be mentioned. For amides, if $R_3$ and $R_4$ both are selected among C1~C4 and $R_1$ is a hydrogen, then $R_2$ and $R_5$ are preferably selected among C1~C10, possibly involving —$NH_2$ or —OH groups. This is particularly interesting if $R_3$=$R_4$. If $R_3$ is a hydrogen and $R_4$ is selected among C1~C4, $R_2$ and $R_5$ are preferably selected among C1~C10. If X is a phenyl group or benzyl-substituted group, $R_3$ is preferably a hydrogen and $R_4$ selected among H or C1~C4. If X is a heterocyclic group, indol group, $R_3$ is preferably a hydrogen and $R_4$ selected among C1~C4. Also if $R_1$, $R_2$ and $R_3$ all are hydrogens, $R_4$ and $R_5$ can preferably together form a ring structure of C4~C10.

Preferably, the solvent is selected among acetamides, benzamides, lactams, anilides and their derivates. Among the acetamides, as non-exclusive examples, can be mentioned acematide, indolacetamide, 2-(acetylthio)acetamide, N-acetylethylenediamine, N,N-dimethylacetamide, N,N-dimethyl-3-aminophenol, N,N-dimethyl-2-phenylglycinonitrile, N-methylacetamide and N-(2-aminoethyl)acetamide. Among the benzamides, as non-exclusive examples, can be mentioned benzamide, benzylacetamide, benzamidomethanol and 2-(trifluoromethyl)benzamide.

Most preferably, the solvent is selected to be acetamide, i.e. $R_1$-$R_5$ all being hydrogens. Preferably, the amount of solvent ranges between 20 and 50 weight-% of the electrolyte, depending of the actual choice of substance.

According to the present invention, the ionisable substance has a cation and an anion. The cation is selected from a group of cations. The group comprises a cation from group 1 or 2 in the periodic table and primary, secondary, tertiary or quarternary organic or inorganic amines, such as $NH_4^+$, $NRH3^+$, $NR2H2^+$, $NR3H^+$ and $NR_4^+$, with R representing organic groups of different types. The organic groups can be of arbitrary length, but typically C1~C20, and be from one of the following types: alkyl, alkylamine, alkenyl, aryl or allyl or another organic molecule. Preferably, the cation is selected to be an alkali cation, i.e. a cation from group 1 in the periodic table, and most preferably $Li^+$.

Similarly, the anion can be selected from a number of alternatives. The group of possible anions comprises $OH^-$, $F^-$, $Cl^-$, $Br^-$, $I^-$, $NO_3^-$, $N(CN)_2^-$, $BF_4^-$, $ClO_4^-$, $RSO_3^-$, $RCOO^-$, $R2N^-$, $RCON^-$ $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF3(CF2)_nSO3^-$ (n=0 . . . 10), $CF3CF2(CF3)2CO^-$, $(CF3SO2)2CH^-$, $(SF_5)_3C^-$, $(CF3SO2)3C^-$, $CF3COO^-$, $CH3COO^-$, $SCN^-$, $(CF_3SO_2)_2N^-$, $(CF_3CF_2SO_2)_2N^-$, $(RCO)_2N^-$, oxalic anions such as bisoxolateborate $(C_2O_4)_2B^-$], where R represents an organic group that can be of arbitrary length, but typically C1~C20, and be from one of the following types: alkyl, alkylamine, aryl or allyl or another organic structure. Preferably, the anion is selected to comprise an imide group, and most preferably bis(trifluoro methane sulfonyl)imide.

The ionisable substance is thus most preferably composed by lithium bis(trifluoro methane sulfonyl)imide. Preferably, the relative amounts of solvent and ionisable substance expressed as a molecular ratio of anion to solvent ranges between 1:1 and 6:1, preferably between 2:1 and 5:1 and most preferably between 3.9:1 and 4.3:1.

According to the present invention, the polymer should be soluble in the mixture and preferably be optically transparent. The polymer is selected as a single polymer or polymer blend. A non-limiting list of possible such polymers comprises: polyacrylates, polymethacrylates, amine functional polymers, amide and/or acrylate functional polymers, polyethers, polyesters, and copolymers of the same. As useful amine functional polymers in this context can be mentioned linear or branched poly ethylene imine (PEI). As useful polyethers in this context can be mentioned poly ethylene oxide (PEO), poly propylene oxide (PPO), and copolymers of PEO and PPO, polylactic acid and glycolide polymers, e.g. poly(2-hydroxypropionic acid). Note however, that the examples above are non-exclusive.

The preferred group of polymers is polymethacrylates with the general formula poly(Rmethacrylates) where R can be $CH_3(CH_2)_n$, n=0–10, an alkyl group, an alkylamine group, an alkenyl group, an aryl group or an allyl group, where the allyl group can be linear cyclic, heterocyclic or aromatic. Non-exclusive examples are poly(methylmethacrylate), poly(ethyl methacrylate), ploy(butylmethacrylate), poly(1-naphtyl methacrylate), poly(2,2,2-trifluoroethyl methacrylate), poly(benzyl methacrylate), poly(butyl methacrylate-co-methylmethacrylate).

Preferably, the polymer is selected to be a polar aprotic polymer and most preferably polymethylmethacrylate. The polymer has preferably a mole weight above 1000 g/mole, and even more preferably over 10000 g/mole. The polymer can be provided in an amount in the range of 3-80 weight-% of the electrolyte, preferably in the range of 3-30 weight-%.

In a particular example of an electrolyte according to the present invention that was particularly useful, the solvent was selected to be acetamide, the ionisable substance to be lithium bis(trifluoro methane sulfonyl)imide and the polymer to be polymetylmetakrylat. The relative amounts for the most attractive electrolyte properties were found to appear at a composition where the relative amounts of acetamide and lithium bis(trifluoro methane sulfonyl)imide expressed as a molecular ratio of bis(trifluoro methane sulfonyl)imide to acetamide ranges between 1:1 and 6:1, preferably between 2:1 and 5:1 and most preferably between 3.9:1 and 4.3:1. The electrolyte comprises preferably 8±2 weight-% polymethylmethacrylate.

Figure 3:
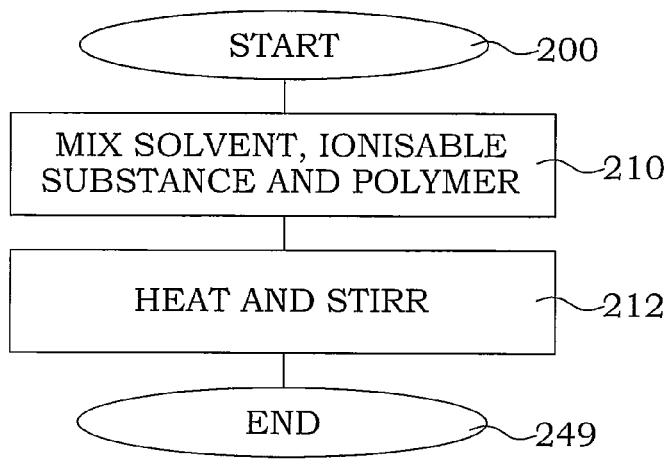
FIG. 3 is a flow diagram illustrating steps of an embodiment of a method according to the present invention.

The electrolyte can be provided in different ways. In a first general embodiment of a manufacturing method of an electrolyte, the three ingredients; the solvent, the ionisable substance and the polymer are simply mixed together in different ways. FIG. 3 illustrates a flow diagram of an embodiment of a method for manufacturing an electrolyte according to the present invention. The method for manufacturing of an electrolyte suitable for electrochromic devices starts in step 200. In step 210, a solvent, an ionisable substance and a polymer are mixed. The solvent, the ionisable substance and the polymer are selected according to what has been described above. In a particular embodiment, the method comprises the further step 212 of heating the mixture during stirring. The heating heats the mixture to a temperature close to or above the glass transition temperature of the polymer. For PMMA, the temperature is preferably raised to about 100-150° C. This step 212 can be performed simultaneous to the mixing step 210 or at least partly following the mixing step 210. The procedure ends in step 249. In alternative manufacturing embodiments, the step 212 might be omitted, as described further below.

In an alternative embodiment of manufacturing an electrolyte according to the present invention, step 210 can instead be divided into two part steps. In a first part step, the solvent and the ionisable substance are mixed and stirred, until a eutectic solution is formed. The polymer is then in a second part step added to the eutectic solution. The mixture is stirred until the polymer is fully dissolved.

In yet another embodiment of manufacturing an electrolyte according to the present invention, step 210 is again divided into two part steps. In a first part step, the polymer is first dissolved in the pure solvent, preferably under stirring and heating. The ionisable substance is thereafter added to the solution, also under stirring.

In yet another embodiment of manufacturing an electrolyte according to the present invention, step 210 comprises a first part step of dissolving all three components; the solvent, the ionisable substance and the polymer in a co-solvent, such as e.g. acetonitrile. The solution is properly mixed and the co-solvent is then evaporated.

Figure 4:
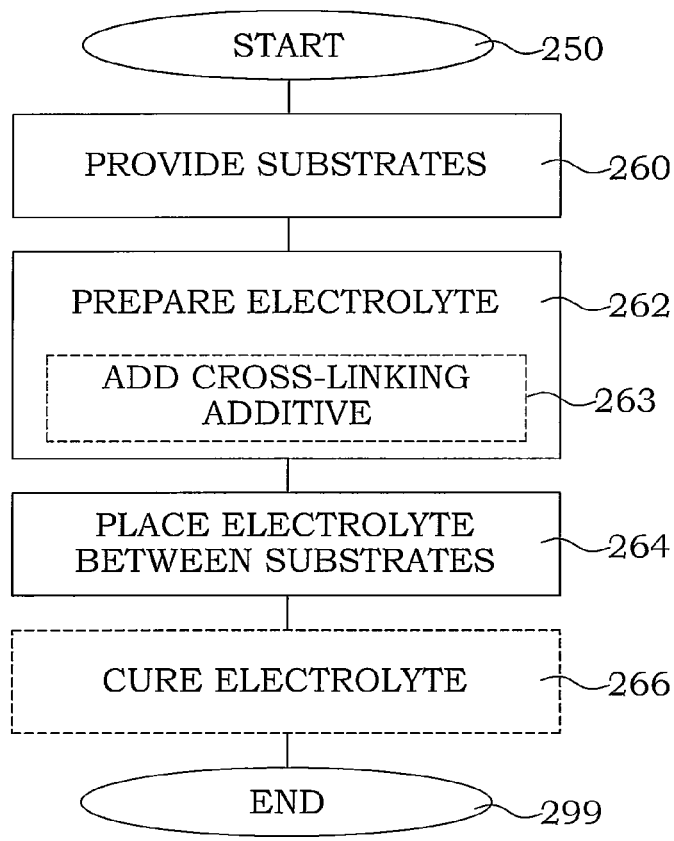
FIG. 4 is a flow diagram illustrating steps of an embodiment of another method according to the present invention.

FIG. 4 illustrates a flow diagram of an embodiment of a method for manufacturing an electrochromic device according to the present invention. The method begins in step 250. In step 260, substrates of the electrochromic device is provided according to any prior art principles. In step 262, an electrolyte is prepared according to what is described above, e.g. according to the method of FIG. 3. In step 264, the electrolyte is placed between the two substrate layers. This step comprises also the process of placing the volume of said electrolyte between two rigid substrates, one flexible substrate and one rigid substrate or between two flexible substrates. When using at least one flexible substrate, such placing step preferably comprises laminating the electrolyte between the two substrate layers. The method ends in step 299.

In some applications, it is of benefit to immobilize the final electrolyte. Benefits of using a final immobilizing or crosslinking are to be found in that the electrolyte becomes permanently immobilized and in that the cross-linked electrolyte experiences a significantly improved mechanical stability. In laminated electrochromic devices, this may e.g. prohibit delamination. The surface adhesion of cross-linked electrolyte is generally also very good. In prior art, this can be achieved e.g. by impregnating for instance a polymer by an easily fluent electrolyte or by adding for instance monomers and an initiator to an electrolyte and cure the additives to providing a polymerization in the electrolyte when the electrolyte is provided in the final location.

A similar approach was found to be possible to operate also with the electrolytes presented in the present disclosure. To that end, an alternative embodiment of an electrochromic device manufacturing method, indicated in FIG. 4 by broken lines, can be utilized. In this embodiment, in an additional step 263, additives that allow transformation of the liquid-like electrolyte to a gel or solid, e.g. cross-linking additives are added to the electrolyte. These additives can be composed by one or several chemical compounds, monomer reactants, oligomer reactants, reaction initiators, stabilizers and/or inhibitors. After the step 264 of placing an electrolyte between the substrates, e.g. a lamination process, an additional step 266 of curing the electrolyte is provided, which leads to a crosslinked structure within the electrolyte. The curing can be performed in different ways. The cross-linking can be thermally or radiation, by e.g. light or electron beam, initiated. This requires that the electrolyte comprises a chemical substance possible to activate the reaction by temperature or radiation. The polymerization can also be performed by e.g. oxygen depletion. In such a case, the curing step is typically not actively performed, but will take place spontaneously after a certain time.

There are several possible systems that will be suitable as cross-linking additives. One may use an added functionality of the already present viscosity enhancing polymer in the electrolyte to present the cross-linking chemical groups. One may add one or several single- or multifunctional monomers or polymers that alone or together with the electrolyte polymer form the cross-linked system. One may use an electrolyte polymer which itself forms physical cross-links if it is held at certain conditions. For some systems, an initiator is necessary to add, and for some systems, a stabilizer or inhibitor is necessary to add.

EXAMPLE 1

Mixing

As described above, different mixing methods are possible. The last one was presently considered as the less favourable one, since it introduces several additional steps, e.g. an evaporation step, which renders the mixing procedure time consuming and expensive.

The three other methods are tested on a candidate electrolyte composition of acematide, LiTFSI and PMMA. In a first test, PMMA and acetamide were first mixed and LiTFSI was than added. Mixing temperatures of 100-150° C. were tested. However, it was found that mixing homogeneity was difficult to obtain without extensive stirring. In a second test, acetamide and LiTFSI were first mixed forming an eutectic solution and PMMA was then added. In this case, the PMMA tended to stay at the surface and despite temperatures of 100-150° C., dissolving of PMMA was difficult to obtain. However, it is believed that systems having very small amounts of polymers could favourably be obtained by such a procedure. In a third test, all three components were all mixed together from the beginning. A good mixing was obtained, at least at certain temperatures. Mixing temperatures of 70-180° C. were tested. At the lowest temperatures, PMMA did not completely dissolve. At temperatures above 150° C., the solution showed tendencies to age. The glass temperature of PMMA is around 120° C. and temperatures higher than this was most preferred.

EXAMPLE 2

Composition

TABLE 2

Viscosity and composition of test compositions.

| Sample | PMMA [w %] | LiTFSI [w %] | Acetamide [w %] | Viscosity [Pas@2 rpm] |
|---|---|---|---|---|
| D | 20 | 40 | 40 | 110 |
| E | 10 | 45 | 45 | 50 |
| F | 9 | 50 | 41 | 42 |
| G | 8 | 50 | 42 | 30 |
| H | 5 | 50 | 45 | 10 |

Figure 5A:
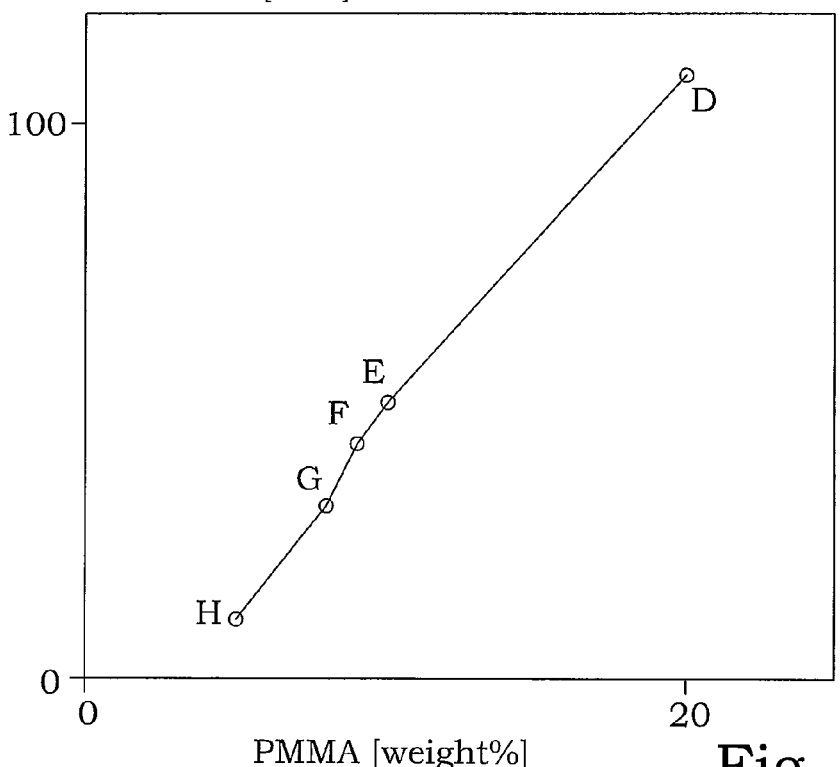
FIG. 5A is a diagram of viscosity as a function of polymer content.

Also in this example, the candidate electrolyte composition of acematide, LiTFSI and PMMA was used. Different proportions of the components were tested, according to Table 2. The viscosity, measured at a shear rate of 4 s$^{-1}$ and a temperature of 22° C., was plotted in FIG. 5A as a function of PMMA content. However, note that the relative amounts of LiTFSI and acetamide differ between the different samples. It was concluded that all samples included in table 2 were possible to use, and for PMMA, practical limits of the content was concluded to be around 3-30 weight %. However, test using other polymers indicates that depending on the actual polymer selected, contents between 3 and 80 weight % may be usable. From the specific tests presented in FIG. 5A, for optical clarity and viscosity reasons, the preferred PMMA content was found to be 8±2 weight %.

The relative amount of the solvent and the salt was also modified. As mentioned above, preferably, the relative amounts of solvent and ionisable substance expressed as a molecular ratio of anion to solvent ranges between 1:1 and 6:1, preferably between 2:1 and 5:1 and most preferably between 3.9:1 and 4.3:1.

Figure 5B:
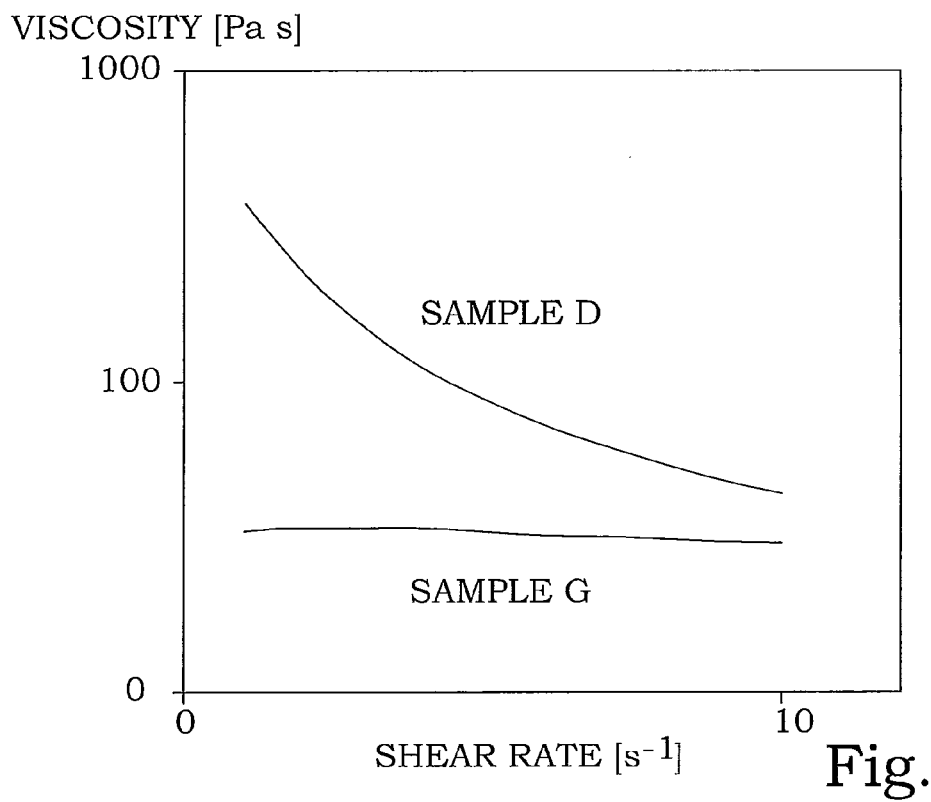
FIG. 5B is a diagram of viscosity behaviour as a function of speed.

It can further be noticed that the amount of polymer not only changes the absolute value of the viscosity, but also changes the behaviour at different rates. In FIG. 5B, a diagram illustrates the viscosity as a function of shear rate at a temperature of 22° C. for two of the samples of Table 2. It can here be seen that the viscosity is reduced considerably at higher speeds for one of the samples. Note the logarithmic viscosity scale. This means that even if the electrolyte has a high viscosity at low speeds, the viscosity is considerably lower at higher speeds, i.e. shear thinning fluid properties. Depending on the actual lamination technique used, these properties can be utilized.

TABLE 3

Viscosity for LiPF$_6$ based electrolytes at variable PMMA concentration.

| Sample | PC [w %] | PMMA [w %] | PEO-PPO [w %] | LiPF$_6$ [w %] | Viscosity [Pas@2 rpm] |
|---|---|---|---|---|---|
| E28 | 50 | 8 | 38 | 4 | 8.0 |
| E42 | 45 | 9 | 42 | 4 | 10.4 |
| E21 | 48 | 10 | 38 | 4 | 25.4 |

Figure 7:
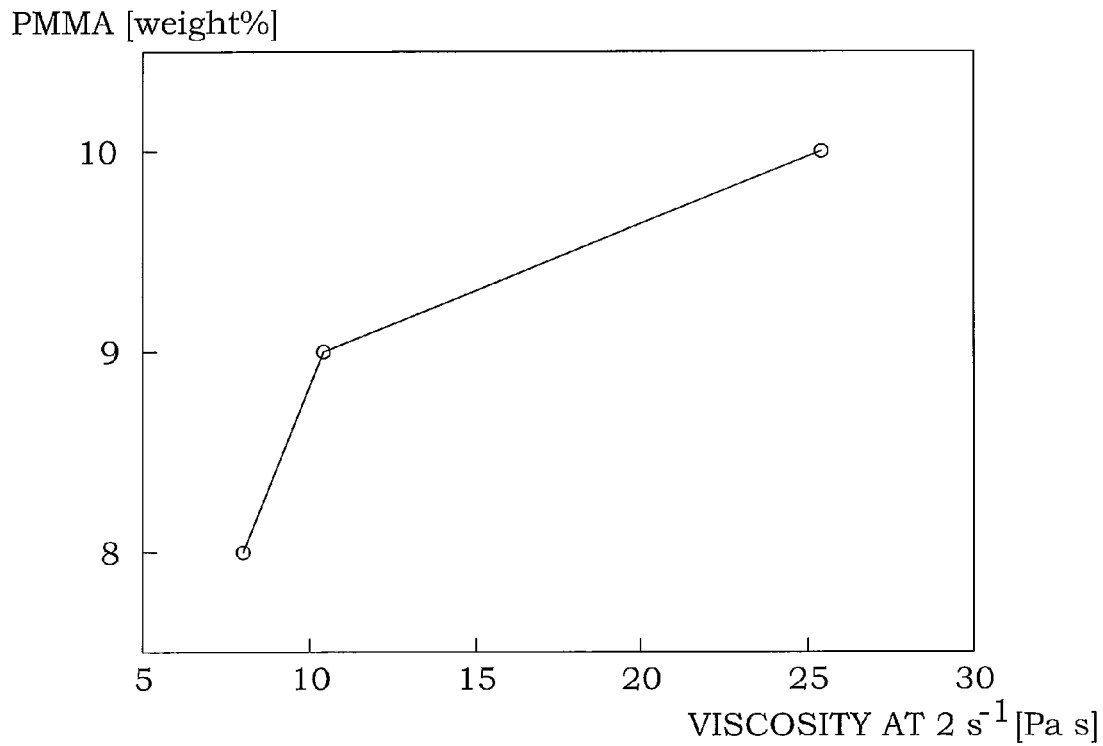
FIG. 7 is another diagram of viscosity as a function of polymer content.

The effect of the amount of polymer can be further illustrated by also comparing other electrolyte system. In Table 3, the composition of three electrolyte samples, E28, E42 and E21 are presented, having different amounts of polymer but the same amount of Li salt. The electrolytes of this particular example have four basic components; $LiPF_6$ as ionisable substance, polypropylene carbonate (PC) as solvent, PMMA as polymer, and also PEO-PPO copolymer. Despite the small differences in concentration of the polymer, large effects on the viscosity were achieved. With this particular selection of components, 10% PMMA was requested to achieve an electrolyte with a viscosity within the most preferred range. The results are also illustrated in FIG. 7.

Figure 8:
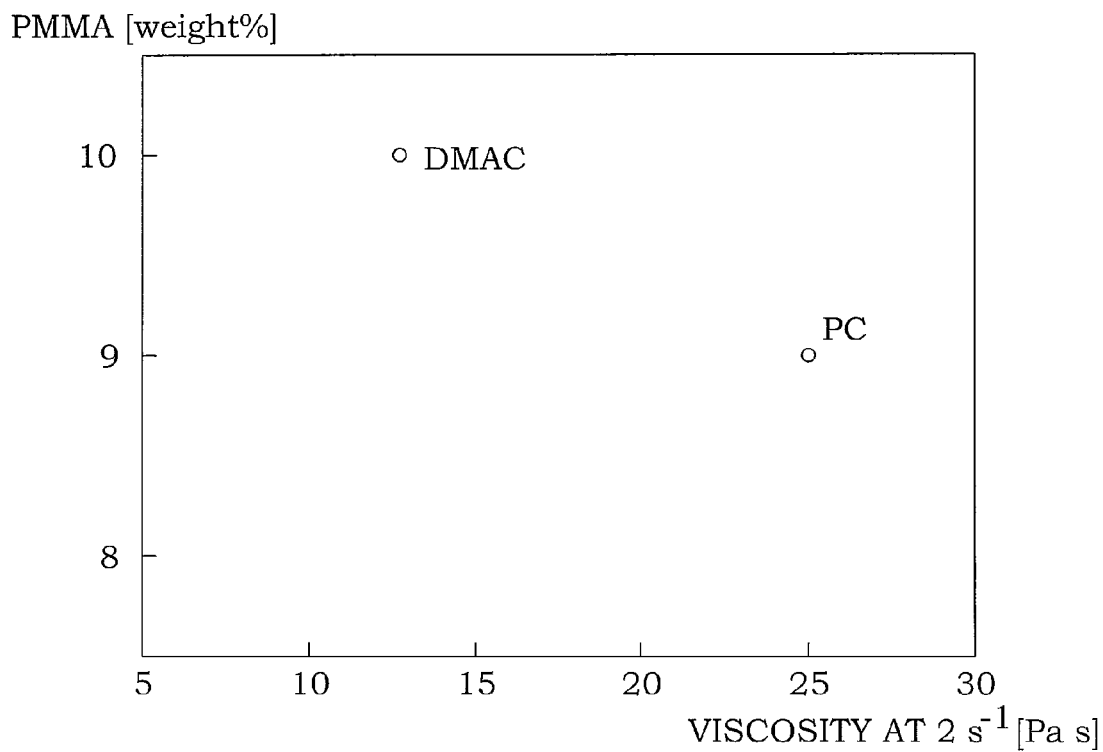
FIG. 8 is a diagram of viscosity for electrolytes having different solvents.

The effect of the solvent was also studied. In a particular example, summarized in Table 4, an electrolyte E38 based on polypropylene Carbonate (PC) as solvent was compared to an electrolyte E_DMAC based on Dimethylacetamide (DMAC) as solvent. The result shows that DMAC gives a more fluid electrolyte despite the higher PMMA content compared to E38. In order to achieve an electrolyte based on DMAC in the most preferred viscosity range, an even higher polymer content would have been needed. The results are also illustrated in FIG. 8.

TABLE 4

Viscosity for $LiPF_6$ based electrolytes with different solvents.

| SAMPLE | PC [w %] | DMAC [w %] | PMMA [w %] | PEO-PPO [w %] | $LiPF_6$ [w %] | Viscosity [Pas@2 rpm] |
|---|---|---|---|---|---|---|
| E_DMAC | 0 | 48 | 10 | 38 | 4 | 12.7 |
| E38 | 49 | 0 | 9 | 38 | 4 | 25.0 |

Figure 9:
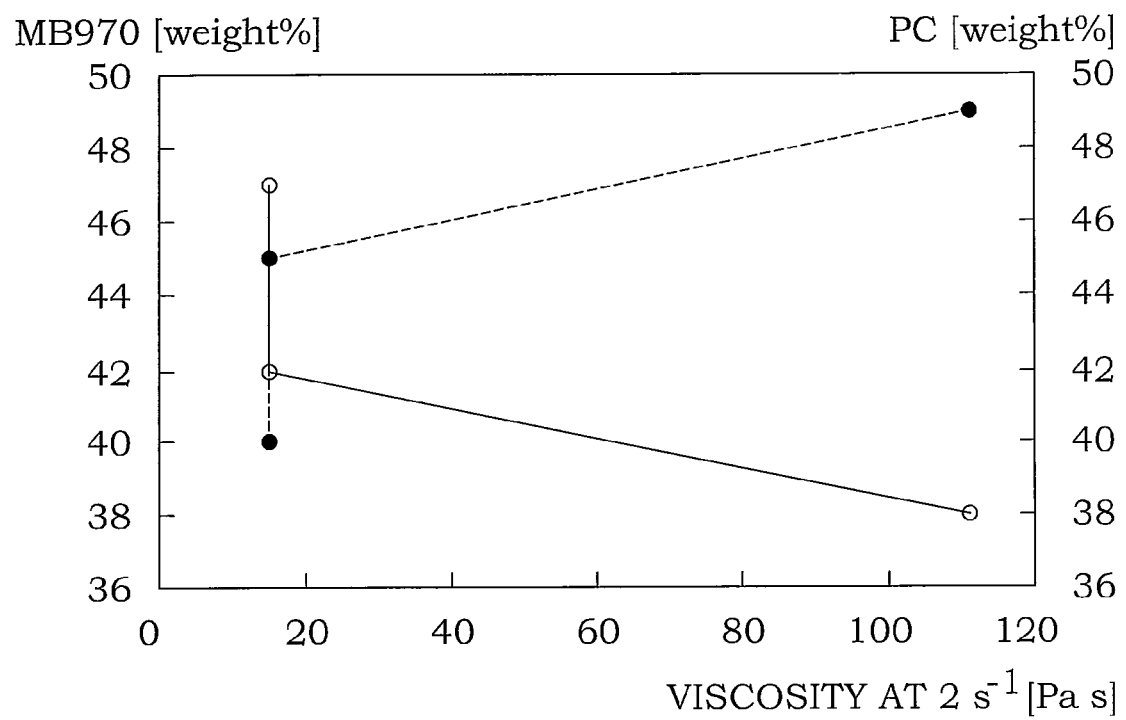
FIG. 9 is a diagram of viscosity as a function of copolymer content.

Another particular example of the importance of compositions is shown in Table 5. Here another copolymer Monobutyl-PEOPPO MW=970 g/mol (MB970) was used. The concentration of salt and PMMA was kept constant. The MB970 concentration was varied as well as the solvent (PC). The graph in FIG. 9 shows the effect of increasing viscosity as the concentration of MB970 is increased and the PC is decreased. From sample E40 to E43, the increment in MB970 content is 4 weight-% and the viscosity is almost unchanged. However, from sample E43 to E44, where the increment in MB970 is 5 weight-%, the viscosity increases almost 7 times.

TABLE 5

Viscosity for $LiPF_6$ based electrolytes with different copolymer content.

| SAMPLE | PC [w %] | PMMA [w %] | MB970 [w %] | $LiPF_6$ [w %] | Viscosity [Pas@2 rpm] |
|---|---|---|---|---|---|
| E40 | 49 | 9 | 38 | 4 | 15.1 |
| E43 | 45 | 9 | 42 | 4 | 15.7 |
| E44 | 40 | 9 | 47 | 4 | 111.4 |

EXAMPLE 3

Application in Electrochromic Devices

Figure 6:
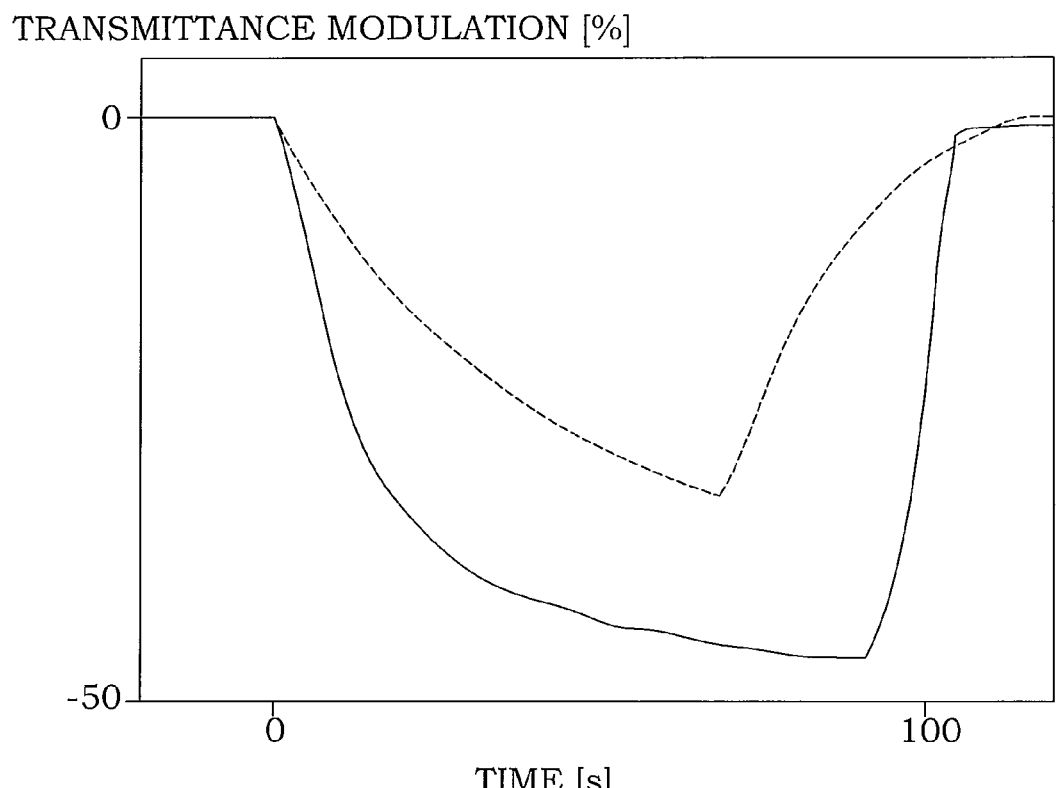
FIG. 6 is a diagram illustrating switching properties of an electrochromic device with electrolytes.

In electrochromic devices, switching range and speed is important. In FIG. 6, a diagram illustrates transmission modulation, in percent, at 550 nm wavelength for two electrochromic devices having different electrolytes. The broken line corresponds to an electrolyte according to prior art and the solid line corresponds to an electrolyte according to sample G of Table 2. These results show that the switching performance of electrolytes according to the present invention can be even better than prior art electrolytes. In the illustrated example, both rate of change in transmittance, i.e. switching speed, and modulation range was improved.

Also other test compositions have been investigated. A number of extensive experiments e.g. with salts like $N(CH_2CH_2CH_3)_4TFSI$, $NH_4TFSI$ and HTSFI, where TFSI represents the anion bis(trifluoro methane sulfonyl)imide have been performed. Also such systems showed good switching performance as well as good durability properties (as discussed more here below).

EXAMPLE 4

Durability

Durability is also a very important feature of electrolytes for electrochromic devices. Durability of electrolytes selected from the present invention has been investigated by both running electrolytes in ageing experiments with actual electrochromic devices and by using electroanalytical methods such as cyclic voltammetry. The ageing experiments showed that electrochromic devices incorporating electrolytes according to the invention experiences very little loss in optical modulation with time and cycle number. Up to 10 000 cycles were tested. This can be compared to prior art devices, where electrolytes may show significant deterioration already at 1 000 cycles. The devices based on the present invention also performed well when aged at an increased temperature (60° C.), whereas the previous are showed strongly accelerated ageing. The cyclic voltammetry results confirmed the improved properties as compared with previous art in terms of a larger electrochemical stability window and improved corrosion resistance for the most commonly used transparent and metallic conductor materials used in electrochromic devices.

EXAMPLE 5

Cross-Linking

In order to achieve a suitable cross-linking additive several compositions have been evaluated. As crosslinking monomers/oligomers, monofunctional acrylates, such as poly(ethyleneglycol) methylether methacrylate with a mole weight of 1100 g/mole have been used as well as difunctional acrylates, such as poly(ethyleneglycol)$_n$diacrylate with n=3 and 400 have been used. Also tri-functional acrylates such as trimehtylolpropaneethoxylate (1 EO/OH) triacrylate with a mole weight of 430 g/mole is possible. As initiators 2,2'-Azobis[2-(2-imidazolin-2-yl)propane]di(hydrochloride)/di(dihydrosulphate), benzoylperoxide and dicumylperoxide can be mentioned. The initiator concentration is typically 1-6 weight % of the cross-linking additive solution.

The additives were mixed into the electrolyte and successively used for lamination. The mixing ratios between additive and electrolyte were varied between 1:2 and 1:10, cross-linking additive:electrolyte. After lamination, the electrolytes were cured by an increase in temperature. Different curing conditions, such as 80° C. during 2-30 minutes, 70° C. during 2-60 min and 55° C. during 5-60 min were tested. In most cases, at least partial cross-linking was achieved, and the exact conditions have to be adapted to the specific composition of electrolyte, additive and intended application.

The embodiments and examples described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An electrolyte for electrochromic devices, comprising a mixture of:
   a solvent;
   said solvent having a structure according to:

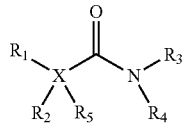

wherein X is a carbon atom, nitrogen atom, oxygen atom or aryl group with arbitrary substituents on the aryl ring, with the proviso that when X is a nitrogen atom, $R_2$ is null, and when X is an oxygen atom, both $R_1$ and $R_2$ are null, and when X is an aryl group, $R_1$, $R_2$ and $R_5$ are all null;
   wherein $R_1$ is a hydrogen atom or a carbon-based group;
   wherein $R_2$ is a hydrogen atom or a carbon-based group;
   wherein $R_3$ is a hydrogen atom or a carbon-based group;
   wherein $R_4$ and $R_5$ individually are selected from a hydrogen atom or a carbon-based group or $R_4$ and $R_5$ together forming a carbon-based group, giving said solvent a ring structure;
   an ionisable substance, comprising a cation and an anion;
   said ionisable substance forming a solution of said cation and said anion together with said solvent; and
   a polymer solvated in said mixture;
   said electrolyte has an apparent Newtonian viscosity in the range of 5-1000 Pa·s at 22° C. and a shear rate of 4 sec$^{-1}$.

2. The electrolyte according to claim 1, wherein said electrolyte has an apparent Newtonian viscosity in the range of 5-200 Pa·s at 22° C. and a shear rate of 4 sec$^{-1}$.

3. The electrolyte according to claim 2, wherein said electrolyte is a non-Newtonian fluid being at least one of shear-thinning and thixotropic.

4. The electrolyte according to claim 1, wherein said solvent comprises a substance having an amide group.

5. The electrolyte according to claim 4, wherein said solvent comprises an amide selected from the group of lactams, anilides and their derivates, preferably from the group of acetamide, indolacetamide, 2-(acetylthio)acetamide, N-acetylethylenediamine, N,N-dimethylacetamide, N,N-dimethyl-3-aminophenol, N-methylacetamide, N-(2-aminoethyl)acetamide, benzamide, benzylacetamide, benzamidomethanol, 2-(trifluoromethyl)benzamide.

6. The electrolyte according to claim 5, wherein said electrolyte has a composition of 20-50 weight-% of said solvent.

7. The electrolyte according to claim 5, wherein said solvent comprises acetamide.

8. The electrolyte according to claim 1, wherein said electrolyte has a composition of a relative amount of solvent and ionisable substance, expressed as a molecular ratio of anion of said ionisable substance to solvent, in the range between 1:1 and 6:1, preferably between 2:1 and 5:1 and most preferably between 3.9:1 and 4.3:1.

9. The electrolyte according to claim 1, wherein said ionisable substance has an anion selected from the group of:

OH$^-$, F$^-$, Cl$^-$, Br$^-$, I$^-$, NO$_3^-$, N(CN)$_2^-$, BF$_4^-$, ClO$_4^-$, RSO$_3^-$, RCOO$^-$, R2N$^-$, RCON$^-$ PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF3(CF2)$_n$SO3$^-$ (n=0 . . . 10), CF3CF2(CF3)2CO$^-$, (CF3SO2)2CH$^-$, (SF$_5$)$_3$C$^-$, (CF3SO2)3C$^-$, CF3COO$^-$, CH3COO$^-$, SCN$^-$, (CF$_3$SO$_2$)$_2$N$^-$, (CF$_3$CF$_2$SO$_2$)$_2$N$^-$, (RCO)$_2$N$^-$, oxalic anions, where R represents an organic group of arbitrary length C1~C20 selected from one of the following types: alkyl, alkylamine, aryl or allyl; and said ionisable substance has a cation selected from the group of:
   a cation from group 1 or 2 in the periodic table; and
   primary, secondary, tertiary or quarternary organic or inorganic amines.

10. The electrolyte according to claim 9, wherein said ionisable substance is a lithium salt.

11. The electrolyte according to claim 10, wherein said ionisable substance is lithium bis(trifluoro methane sulfonyl) imide.

12. The electrolyte according to claim 1, wherein said ionisable substance has an imide group.

13. The electrolyte according to claim 1, wherein said polymer has a mole weight above 1000 g/mole, preferably above 10 000 g/mole.

14. The electrolyte according to claim 1, wherein said electrolyte has a composition of 3-80 weight-% of said polymer and preferably 3-30 weight-% of said polymer.

15. The electrolyte according to claim 1, wherein said polymer comprises a polymer selected from: polymer based on at least one of acrylates and methacrylates, amine functional polymers, amide functional polymers, polyethers, polyesters, and copolymers of the same.

16. The electrolyte according to claim 15, wherein said polymer comprises polyalkylmethacrylate, preferably polymethylmethacrylate.

17. The electrolyte according to claim 1, wherein said electrolyte comprises acetamide, lithium bis(trifluoro methane sulfonyl)imide and PMMA.

18. The electrolyte according to claim 1, wherein said electrolyte further comprising additive that allow transformation of the liquid-like electrolyte to a gel or solid.

19. The electrolyte according to claim 18, wherein said additive comprises at least one of a monomer or oligomer reactant and a reaction initiator.

20. An electrochromic device comprising an electrolyte, said electrolyte comprises a mixture of:
a solvent;
said solvent having a structure according to:

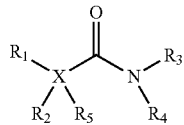

wherein X is a carbon atom, nitrogen atom, oxygen atom or aryl group with arbitrary substituents on the aryl ring, with the proviso that when X is a nitrogen atom, $R_2$ is null, and when X is an oxygen atom, both $R_1$ and $R_2$ are null, and when X is an aryl group, $R_1$, $R_2$ and $R_5$ are all null;
wherein $R_1$ is a hydrogen atom or a carbon-based group;
wherein $R_2$ is a hydrogen atom or a carbon-based group;
wherein $R_3$ is a hydrogen atom or a carbon-based group;
wherein $R_4$ and $R_5$ individually are selected from a hydrogen atom or a carbon-based group or $R_4$ and $R_5$ together forming a carbon-based group, giving said solvent a ring structure;
an ionisable substance, comprising a cation and an anion;
said ionisable substance forming a solution of said cation and said anion together with said solvent; and
a polymer solvated in said mixture;
said electrolyte has an apparent Newtonian viscosity in the range of 5-1000 Pa·s at 22° C. and a shear rate of 4 $sec^{-1}$.

21. A method for manufacturing of an electrolyte suitable for electrochromic devices, comprising the step of:
mixing a solvent, an ionisable substance and a polymer;
said ionisable substance comprising a cation and an anion;
said solvent having a structure according to:

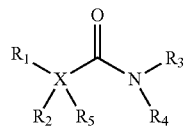

wherein X is a carbon atom, nitrogen atom, oxygen atom or aryl group with arbitrary substituents on the aryl ring, with the proviso that when X is a nitrogen atom, $R_2$ is null, and when X is an oxygen atom, both $R_1$ and $R_2$ are null, and when X is an aryl group, $R_1$, $R_2$ and $R_5$ are all null;
wherein $R_1$ is a hydrogen atom or a carbon-based group;
wherein $R_2$ is a hydrogen atom or a carbon-based group;
wherein $R_3$ is a hydrogen atom or a carbon-based group;
wherein $R_4$ and $R_5$ individually are selected from a hydrogen atom or a carbon-based group or $R_4$ and $R_5$ together forming a carbon-based group, giving said solvent a ring structure; and
said ionisable substance forming a solution of said cation and said anion together with said solvent.

* * * * *